United States Patent
Bührke

(10) Patent No.: US 7,758,682 B2
(45) Date of Patent: Jul. 20, 2010

(54) NON-AQUEOUS INKS WITH AN EXTENDED CAP-OFF TIME

(75) Inventor: Kirsten Bührke, Neustadt a.d. Aisch (DE)

(73) Assignee: J.S. Staedtler GmbH & Co. KG, Nürnberg (DE)

(*) Notice: Subject to any disclaimer, the term of this patent is extended or adjusted under 35 U.S.C. 154(b) by 502 days.

(21) Appl. No.: 11/431,402

(22) Filed: May 10, 2006

(65) Prior Publication Data

US 2006/0278125 A1    Dec. 14, 2006

(30) Foreign Application Priority Data

May 10, 2005    (DE) .................. 10 2005 022 425

(51) Int. Cl.
*C09D 11/00* (2006.01)

(52) U.S. Cl. .................. 106/31.35; 106/31.67

(58) Field of Classification Search .............. 106/31.35, 106/31.67
See application file for complete search history.

(56) References Cited

U.S. PATENT DOCUMENTS

| 4,793,264 | A | * | 12/1988 | Lin et al. ............ 106/31.35 |
| 5,308,390 | A | * | 5/1994 | Pennaz ................ 524/313 |
| 5,350,446 | A | * | 9/1994 | Lin et al. ............ 106/31.61 |
| 6,176,914 | B1 | * | 1/2001 | Feustel et al. ........ 106/31.67 |
| 6,517,619 | B1 | * | 2/2003 | Nowak et al. ......... 106/31.32 |
| 2006/0117996 | A1 | * | 6/2006 | Ichikawa et al. ...... 106/31.86 |
| 2007/0022904 | A1 | * | 2/2007 | Kitawaki et al. ...... 106/31.86 |
| 2007/0119339 | A1 | * | 5/2007 | Kovacs et al. ........ 106/31.34 |

FOREIGN PATENT DOCUMENTS

EP          592182 A1  *  4/1994
JP     2006218622 A    *  8/2006

* cited by examiner

*Primary Examiner*—Jerry Lorengo
*Assistant Examiner*—Veronica Faison Gee
(74) *Attorney, Agent, or Firm*—Friedrich Kueffner

(57) ABSTRACT

A non-aqueous ink with an extended cap-off time for writing, drawing, painting or marking, or a writing or marking fluid respectively, having organic solvents, binding agents, drying retarders, colorants and if necessary further additives. The ink contains a fatty acid or a fatty acid blend as a drying retarder.

3 Claims, No Drawings

NON-AQUEOUS INKS WITH AN EXTENDED CAP-OFF TIME

BACKGROUND OF THE INVENTION

1. Field of the Invention

The present invention relates to non-aqueous inks with an extended cap-off time, in particular relating to an ink for writing, drawing, painting or marking.

2. Description of the Related Art

Extended cap-off time in the present context means that the ink in the writing or application utensil does not dry up even after longer intervals with an unsealed writing tip or with a removed protective cap. The proposed ink makes it possible that the writing or application device can be left open for longer periods of time, preferably several hours or days.

Such inks are known in principle. In DE 196 26 824 C2 marker inks are employed with a cap-off additive, wherein the cap-off additive is present in the form of an insoluble paraffin wax and/or polyolefin wax in organic solvents. A good cap-off time of the marker is attained in this way.

However, it is disadvantageous that the cap-off effectiveness is not sufficient for application in holders with a fine line thickness.

To achieve an acceptable cap-off time in holders with a fine line thickness the paraffin content can be increased which however is effected at the cost of the downstroke that becomes very cloudy. In order to effectively use the parrafins/polyolefins also in fine line thicknesses without increasing their content, a very complex ink production procedure must be carried out.

Further marker inks are known which have a modified triglyceride as a cap-off additive. The disadvantage of using such cap-off additives is that the cap-off effectiveness is significantly inferior to that of inks with paraffin as a cap-off additive. Especially for inks with a high solid content, such as for example light-fast inks and overhead inks with luminous color, sufficient cap-off times were not achieved using these additives.

Monoesters of 2,2,4-Trimethyl-1,3-pentandiol diisobutyrate (TXIB) are also known as cap-off additives.

This additive which belongs to the group of plasticizers has a relatively high boiling point which can lead to a certain protection against drying. However, it is considered disadvantageous in this regard that the additive has a relatively high boiling point which, according to TXIB and literature, is at 244° C.; Inks with such an additive that have a good cap-off time also have a very high plasticizer content. The downstrokes of these inks dry only very slowly and are strikingly bad in terms of bonding strength. All in all, it is considered disadvantageous that a cap-off time is attained at the cost of bonding strength.

Moreover, a marking fluid is know from the publication JP-P/AS 1-35028 B2 to which a solid paraffin wax is added at room temperature that then dissolves completely in the organic solvent. It is considered disadvantageous that the employed solvents are no longer used in inks due to their physiology and covalent properties. Examples include chloroform, diethyl ether and benzine.

In comparison, an ink with an increased cap-off time is described in JP-P/AS 6-47 660 which can be left for longer periods of time without a protective cap. This ink consists of a colorant, an organic solvent, resin, decaglycerin and a-olefin (alpha-olefins). Olefin is the group designation for acyclic and cyclic aliphatic hydrocarbons with one or more reactive double bonds in the molecule.

When containing a-olefins the double bond is located between the first and second carbon atoms and is very reactive due to its unsaturated nature.

The presence of a-olefins in this ink is disadvantageous since it can render the ink unstable for storage due to reactions of the a-olefins with other ink components.

SUMMARY OF THE INVENTION

It is, therefore, the object of the present invention to create a non-aqueous pigmented ink or a writing or marking fluid on the basis of organic solvents which has a high cap-off time, i.e., which makes it possible that a writing or marking utensil can remain uncovered for a longer period of time without having the ink dry up in the application tip in the process, to such an extent that the device becomes useless.

In addition, a good transparency, luminosity and bonding strength of the downstrokes must be warranted especially for permanent inks, i.e., waterproof inks, even after drying of the marking and especially when applying to non-absorbent surfaces and for backlight applications or markings, for example on glass surfaces or on transparencies for daylight projection.

It is a further object of the invention that the ink flow is not negatively impacted by the addition of so-called cap-off additives. It is also an object of the invention that the ink can be produced cost-effectively by ensuring that the cap-off additive is soluble in solvents.

These objects are met in non-aqueous inks comprising organic solvents, binding agents, antidriers or drying retarders, colorants and if necessary further additives, by using a cap-off additive as an drying retarder which is made based on the general formula $$C_xH_{y-n}COOH$$

wherein $x \geq 3$, $y = 2x+1$ and $n = 0$ or $2$.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DETAILED DESCRIPTION OF THE INVENTION

These cap-off additives are solid fatty acids or fatty acid blends which are soluble in the available solvents. The solubility has the advantage that the additive does not have to be stirred before or during each application/process step when producing the ink according to the invention.

The fatty acids or fatty acid blends dissolve already at room temperature in many solvents which are suitable for inks. Examples for solvents include n-propanol, i-propanol, n-butanol, 1-methoxypropanol-2, MEK and/or ethyl alcohol.

In general it can be stated that
- as a rule, the fatty acids can be used as commercially available raw materials,
- these fatty acids are long-chain, saturated or unsaturated aliphatic monocarboxylic acids,
- lower fatty acids with up to three C-atoms are present as fluids,
- fatty acids having medium chain lengths are present as fluids or solids,
- higher fatty acids are solid and odorless,
- unsaturated fatty acids have lower melting points than the corresponding saturated fatty acids, transfatty acids have higher melting points than those with cis-configured double bonds, saturated fatty acids are relatively stable to oxygen; and unsaturated fatty acids and particularly polyunsaturated fatty acids easily undergo autooxidation.

Examples of fatty acids found in nature are listed in the following table.

| Code | Melting Point (° C.) | Nomenclature | Trivial Name |
|---|---|---|---|
| 4:0 | −6 | Butanoic acid | Butyric acid |
| 6:0 | −3.9 | Hexanoic acid | Caproic acid |
| 8:0 | 17 | Octanoic acid | Caprylic acid |
| 10:0 | 31 | Decanoic acid | Capric acid |
| 12:0 | 44 | Dodecanoic acid | Lauric acid |
| 14:0 | 58.5 | Tertadecanoic acid | Myristic acid |
| 16:0 | 63 | Hexadecoic acid | Palmitic acid |
| 18:0 | 69-71 | Octadecoic acid | Stearic acid |
| 20:0 | 75 | Eicosanic acid | Arachidonic acid |
| 22:0 | 79-80 | Docosanic acid | Behenic acid |
| 18:1 | 16 | (Z)-9-octadecenoic acid | Oleic acid |

Source: www.organik.uni-erlangen.de/vostrowsky/natstoff/1nafettsr.pdf

Saturated combinations of stearic acid (C-18) and palmitic acid (C16) or of their blends, also known as stearin were used as an example. Oleic acid was used as an unsaturated fatty acid. Oleic acid corresponds to stearic acid, it contains however one double bond.

Behenic acid (C22) was used as a representative as a long-chain fatty acid. The solid saturated fatty acids such as stearic acid and/or palmitic acid show very good cap-off effectiveness. To attain a good cap-off time it has been shown that solid, soluble fatty acids in solvents are suitable.

The effectiveness of fatty acids is based on the fact that they form a protection layer at the phase interface ink/air and thus can limit the evaporation of the solvent. At the same time, a higher content of fatty acid in the ink is better for the cap-off effectiveness, however the stability against wiping or drying time of the downstrokes on a non-absorbent surface is respectively worse. Likewise inks with a very high fatty acid content form a dull looking surface after drying. Consequently, the concentration of the fatty acid in the ink should be adjusted in relation to the other components such as colorants and binding agents for an optimal effectiveness.

The invention is illustrated based on several embodiments in the following.

FRAMEWORK EXAMPLE

| | |
|---|---|
| 50-95% by weight | organic solvent (LM) |
| 0-20% by weight | binding agent (BM) |
| 0.05-10% by weight | fatty acid and/or fatty acid blend (COA) |
| 1-30% by weight | colorant (FM) |
| 0-10% by weight | tenside (T) |
| 0-15% by weight | additive (A1, A2, . . . ) |

RECIPE EXAMPLE 1

| | |
|---|---|
| n-propanol (LM) | 69% by weight |
| n-butanol (LM) | 8% by weight |
| Stearic acid (COA) | 4% by weight |
| Binding agent (BM) | 4% by weight |
| Solvent Black 29 (FM) | 15% by weight |

RECIPE EXAMPLE 2

| | |
|---|---|
| n-propanol (LM) | 68% by weight |
| n-butanol (LM) | 7% by weight |
| Stearic acid (COA) | 5% by weight |
| Binding agent (BM) | 3% by weight |
| Solvent Black 29 (FM) | 15% by weight |
| Fluorinated surfactant (T) | 2% by weight |

RECIPE EXAMPLE 3

| | |
|---|---|
| n-propanol (LM) | 61% by weight |
| n-butanol (LM) | 15% by weight |
| Stearic acid/Palmitic acid blend (COA) | 6% by weight |
| Binding agent (BM) | 3% by weight |
| Solvent Black 29 (FM) | 15% by weight |

RECIPE EXAMPLE 4

| | |
|---|---|
| n-propanol (LM) | 72.4% by weight |
| 1-methoxypropanol-2 (LM) | 3.8% by weight |
| Stearic acid (COA) | 3.8% by weight |
| Binding agent (BM) | 3% by weight |
| Solvent Black 29 (FM) | 15.2% by weight |
| Fluorinated surfactant (T) | 1.8% by weight |

Surprisingly, it has been shown that for inks containing waxes as cap-off additives, such as for example solvent inks with paraffin waxes or paraffin wax dispersions, fatty acids can be used as a combination partner. Paraffin waxes in part enhance the cap-off time. An example therefor is recipe 5.

To control properties such as the delustering effect, drying behaviour and/or bonding strength for whiteboard markers, the option of combining fatty acids and waxes is advisable. By using both of the cap-off additives the undesired smudging effect is positively prevented.

RECIPE EXAMPLE 5

| | |
|---|---|
| n-propanol (LM) | 83% by weight |
| Stearic acid/Palmitic acid blend (COA) | 3% by weight |
| Paraffin dispersion (A1) | 1.5% by weight |
| Pigment Blue 15:3 (FM) | 3.5% by weight |
| Lubricant (A2) | 9% by weight | n-propanol, i-propanol, n-butanol, 1-methoxypropanol-2, MEK and/or ethyl alcohol are used for example as solvents. Fatty acids dissolve in these solvents. The use of n-propanol resulted in a very good cap-off time of the inks. n-butanol is also well suited as a co-solvent, as can be seen in the examples.

Water-insoluble solvent-based colorants and water-soluble, alkaline colorants are used as colorants for permanent inks. The water-soluble colorants are varnished by adding an acidic resin and converted into a water-insoluble form.

Colorants for water-soluble inks can be acidic colorants which dissolve in water and partially in organic solvents, so that the dried downstroke remains water-soluble.

Pigments can also be used as colorants, for example for whiteboard marker inks. Pigments can be present in combination with a carrier, for example polyvinyl butyral and/or ethylcellulose. The carrier dissolves in the solvent, wherein the pigment is finely distributed in the process.

Binding agents are found in permanent dye inks. They are used, on the one hand, to improve the bonding strength of the dried downstrokes on non-absorbent surfaces, and on the other, to use the acidic resins for varnishing of the alkaline colorants.

In the area of pigmented inks a binding agent is usually already introduced or applied by way of the pigment preparation. To specifically improve the bonding strength of inks, binding agents may be additionally added. However, it should be taken into account that the cap off time of the inks can be changed depending on the type of binding agent and quantity.

In any case the binding agent must be soluble in the organic solvent. Phenol formaldehyde resin and/or a fumaric acid-colophonium-adduct can be used as such a binding agent. Acidic resins are not absolutely necessary if no alkaline colorants are used.

Various types of additives may be contained in inks such as antifoaming agents, dispersing agents, lubricants, oils and tensides.

Up to now tensides, particularly the highly effective fluorinated surfactants could not be used in the production of cap-off inks according to the state of the art. For example inks with paraffin wax reacted very sensitively to surfactants. It has been shown that cap-off inks which are based on the properties of fatty acids are significantly less sensitive to surfactants, so that fluorinated surfactants can be used if necessary. The addition of surfactants influences the cap-off time only minimally.

The application of fatty acids has the following advantages:

- very good results can be attained with fatty acids as a cap-off additive for pigmented inks on a solvent basis,
- fatty acids, for example stearic acids, can be combined with paraffin waxes/paraffin dispersions,
- the cap-off additive is soluble in many commonly used solvents,
- such cap-off additives can be used, where applicable in the ink-jet field,
- inks having fatty acid as a cap-off additive can be combined with fluorinated surfactant,
- fatty acids are inexpensive, commercially available raw materials,
- an improvement is achieved with respect to bonding strength on glass/in a water bath,
- the incorporation of fatty acids into an ink base can be very uncomplicated and without much effort, which is associated with cost savings.

If writing utensils or holders are somewhat dried at the writing tip—but not completely dried up—after being left open for too long, they are then again regenerated by remaining closed with the protective cap.

Surprisingly, a further positive effect was determined when using a combination of fatty acids with tensides. Such a combination is found in the recipe examples 2 and 4.

It must be said in this regard that by using highly effective fluorinated surfactants in inks a wetting of easy-clean and nano treated surfaces such as Teflon is possible.

Previously, it was disadvantageous that inks which were mixed with fluorinated surfactants exhibited a very strong drain-back effect in the holders. In general, drain back means that inks sink back into the ink reservoir when the writing tip of the holder is left pointing upwards, so that the writing tip is not supplied with sufficient ink when starting to write. The strength of the drain-back effect is influenced by the colorants, the colorant concentrations, solvents and/or writing tip type used. This has the result that the holder does not immediately write and almost seems to be dried up. After some time, normally after a few minutes the proper ink flow is restored. This effect was observed to be very strong when using fluorinated surfactants in such inks.

The drain back effect does not occur in writing utensils according to the state of the art having inks that do not contain fluorinated surfactants. Unfortunately, these inks do not wet difficult surfaces such as nano surfaces. Also, the downstrokes of inks do not form exact lines and fray, particularly on surfaces which are not cleaned.

Surprisingly, it was determined that for inks containing fluorinated surfactants the drain-back effect can be significantly reduced by adding fatty acids, depending on the quantity used.

Chemical Structures:

Fluorinated surfactant: $C_7F_{15}$—$CH_2O$—$(CH_2$—$CH_2$—$O)_{4-14}$—R

Fatty acid (example stearic acid): $CH_3$—$(CH_2)_{16}$—COOH

Since the fatty acids are a soluble additive, it could also be used for ink jet inks in order to increase the cap-off time for such inks. Since the inks in the ink jet field are not filled in ink reservoirs that could for example prevent a settling of the insoluble paraffin wax, paraffin wax could not be used as a cap-off additive. Fatty acids on the other hand are soluble, do not settle and are evenly distributed in the entire ink.

The invention relates to a non-aqueous ink with an extended cap-off time for writing, drawing, painting or marking as a writing or marking fluid having organic solvents, binding agents, antidriers, colorants and if necessary further additives, wherein the antidrier is a fatty acid or fatty acid blend. The fatty acid or the fatty acid blend is soluble in at least one solvent.

Fatty acids include butyric acid, caproic acid, caprylic acid, capric acid, lauric acid, myristic acid, palmitic acid, stearic acid, arachidonic acid, behenic acid and/or oleic acid.

The binding agent is soluble in the organic solvent. The colorant is a water-soluble or water-insoluble colorant or a water-insoluble and/or insoluble pigment in solvents.

While specific embodiments of the invention have been described in detail to illustrate the inventive principles, it will be understood that the invention may be embodied otherwise without departing from such principles.

I claim:

1. A non-aqueous ink with an extended cap-off time for writing, drawing, painting or marking, as a writing or marking fluid, comprising

| | |
|---|---|
| 50-95% by weight | organic solvent |
| more than 0-20% by weight | binding agent |
| 0.05-10% by weight | drying retarder |
| 1-30% by weight | colorant |
| more than 0-10% by weight | fluorinated surfactant |
| 0-15% by weight | one or more additives, | wherein the colorant is a water-soluble or water-insoluble colorant, wherein the drying retarder is a solid fatty acid or a blend of solid fatty acids that are solid at room temperature, wherein the solid fatty acid is selected from the group consisting of capric acid, lauric acid, myristic acid, palmitic acid, stearic acid, arachidonic acid and behenic acid.

2. The ink according to claim 1, wherein the binding agents are soluble in the organic solvents.

3. The ink according to claim 1, wherein the solid fatty acid or the solid fatty acid blend is soluble in at least one solvent.

* * * * *